US010214303B1

(12) United States Patent
Turner et al.

(10) Patent No.: US 10,214,303 B1
(45) Date of Patent: Feb. 26, 2019

(54) LOW COST LAUNCH VEHICLE FAIRING

(71) Applicant: Space Systems/Loral, LLC, Palo Alto, CA (US)

(72) Inventors: Andrew E. Turner, Mountain View, CA (US); William G. Hart, III, Palo Alto, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 165 days.

(21) Appl. No.: 15/277,505

(22) Filed: Sep. 27, 2016

(51) Int. Cl.
*B64G 1/64* (2006.01)
*B64G 1/24* (2006.01)
*B64G 1/14* (2006.01)

(52) U.S. Cl.
CPC ............... *B64G 1/641* (2013.01); *B64G 1/14* (2013.01); *B64G 1/242* (2013.01); *B64G 1/64* (2013.01); *B64G 2001/643* (2013.01)

(58) Field of Classification Search
CPC . B64G 1/14; B64G 1/64; B64G 1/641; B64G 1/242; B64G 2001/643
See application file for complete search history.

(56) References Cited

U.S. PATENT DOCUMENTS

| | | | | |
|---|---|---|---|---|
| 5,143,327 A | * | 9/1992 | Martin | B64G 1/14 244/171.3 |
| 5,522,569 A | * | 6/1996 | Steffy | B64G 1/002 136/245 |
| 5,613,653 A | * | 3/1997 | Bombled | B64G 1/641 244/173.1 |
| 5,927,653 A | * | 7/1999 | Mueller | B64G 1/14 244/138 R |
| 6,059,234 A | * | 5/2000 | Mueller | B64G 1/14 244/118.1 |
| 6,193,187 B1 | * | 2/2001 | Scott | B64G 1/14 244/159.3 |
| 6,244,541 B1 | * | 6/2001 | Hubert | B64G 1/22 244/173.2 |
| 6,695,251 B2 | * | 2/2004 | Rodden | G05D 1/107 244/164 |
| 6,776,375 B1 | * | 8/2004 | Engelhardt | B64G 1/222 244/137.1 |

(Continued)

FOREIGN PATENT DOCUMENTS

WO WO 2013/039426 A1 3/2013

*Primary Examiner* — Philip J Bonzell
*Assistant Examiner* — Tye William Abell
(74) *Attorney, Agent, or Firm* — Weaver Austin Villeneuve & Sampson LLP

(57) ABSTRACT

A launch vehicle includes an upper stage and an integral fairing. In a launch configuration, the integral fairing is configured to enclose, between an aft portion and a forward portion, one or more payloads. The integral fairing includes a mechanical attachment with the upper stage proximal to the aft portion, and a nose cap proximal to the forward portion and a passive venting arrangement that equalizes pressures internal and external to the integral fairing. The integral fairing is configured to permit deployment of at least one payload, while avoiding: (i) separation of the integral fairing into two or more parts, (ii) separation of the integral fairing from the upper stage, and (iii) articulation of the mechanical attachment. The upper stage may provide single stage to orbit capability.

12 Claims, 8 Drawing Sheets

(56) References Cited

U.S. PATENT DOCUMENTS

| | | | | |
|---|---|---|---|---|
| 6,827,313 | B1* | 12/2004 | Aldrin | B64G 1/1085 244/158.9 |
| 6,948,682 | B1* | 9/2005 | Stephenson | B64G 1/14 244/36 |
| 7,832,687 | B1* | 11/2010 | Das | B64G 1/002 244/158.5 |
| 9,242,743 | B2* | 1/2016 | Chu | B64G 1/002 |
| 9,434,485 | B1* | 9/2016 | Lehocki | B64G 1/22 |
| 2002/0000495 | A1* | 1/2002 | Diverde | B64G 1/002 244/137.1 |
| 2004/0124312 | A1* | 7/2004 | Mueller | B64G 1/105 244/150 |
| 2006/0219846 | A1* | 10/2006 | Johnson | B64G 1/24 244/158.9 |
| 2007/0012820 | A1* | 1/2007 | Buehler | B64G 1/14 244/158.9 |
| 2007/0063107 | A1* | 3/2007 | Mueller | B64G 1/14 244/173.1 |
| 2007/0120020 | A1* | 5/2007 | Engelhardt | B64G 1/242 244/173.1 |
| 2009/0127398 | A1* | 5/2009 | Johnson | B64G 1/402 244/158.1 |
| 2015/0034770 | A1* | 2/2015 | Vandervort | B64G 1/52 244/172.1 |
| 2015/0247714 | A1* | 9/2015 | Teetzel | F42B 15/01 244/3.11 |
| 2016/0031572 | A1* | 2/2016 | Dube | B64G 1/641 244/173.3 |
| 2016/0311562 | A1* | 10/2016 | Apland | B64G 1/641 |
| 2016/0318635 | A1* | 11/2016 | Field | B64G 1/641 |

* cited by examiner

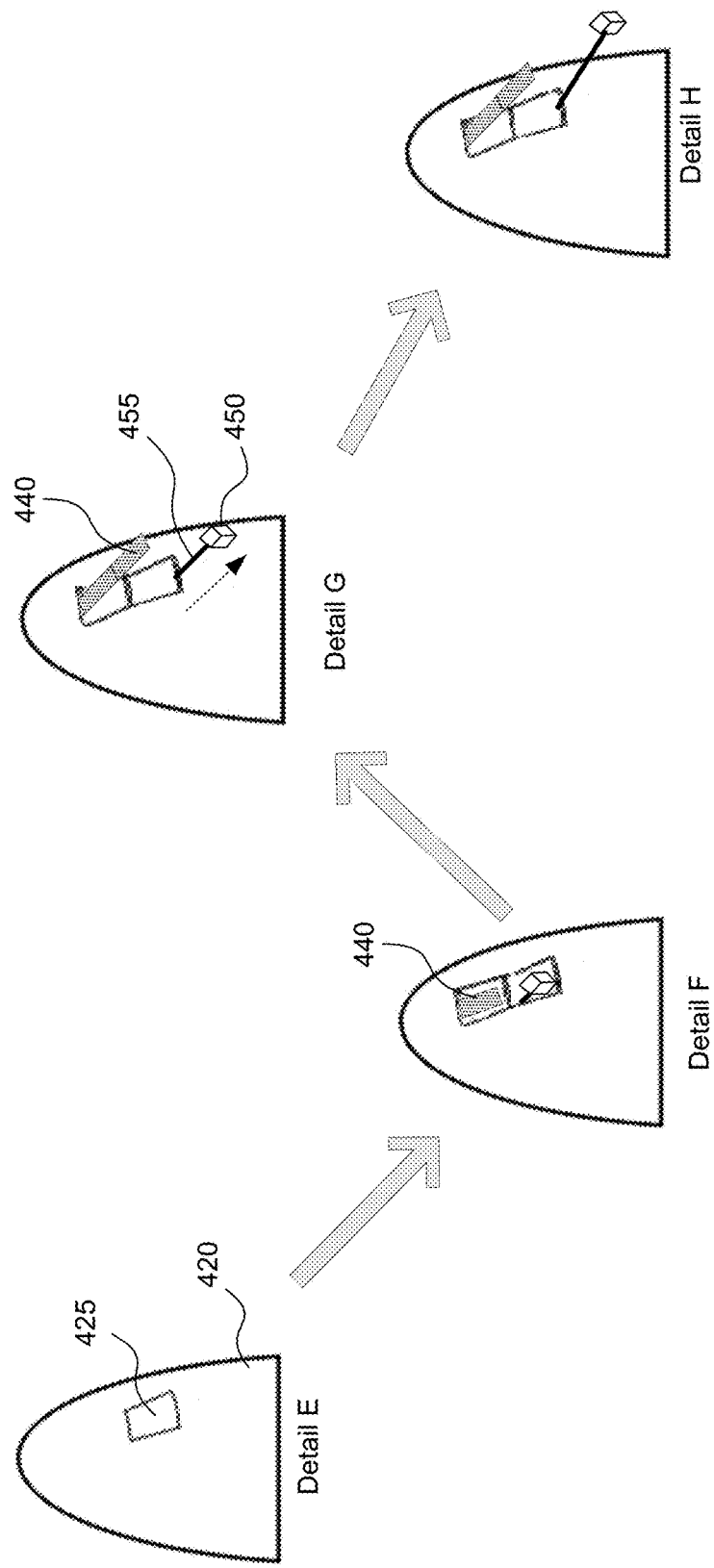

LOW COST LAUNCH VEHICLE FAIRING

TECHNICAL FIELD

This disclosure relates generally to a launch vehicle fairing, and more particularly to techniques wherein a non-separating launch vehicle fairing is configured to enclose a deployable payload.

BACKGROUND

Most launch vehicle nose cones or fairings are made in at least two separable pieces that have to be precisely fitted together for launch. After escape from the Earth's atmosphere, the two or more pieces are separated, an operation that requires complex arrangements to generate specific trajectories for the separating pieces so as to avoid collision with the launch vehicle or payloads separated from the launch vehicle.

Lower cost nose cones that are configured to permit deployment of one or more payloads are desirable.

SUMMARY

The present inventors have appreciated that a launch vehicle fairing may be advantageously configured as an integral monocoque arrangement that is permanently affixed to an upper stage of a launch vehicle. The launch vehicle fairing may include one or more hatches disposed in a portion of the fairing that is between a forward nose cap and an aft interface with the upper stage.

According to some implementations, a launch vehicle includes an upper stage and an integral fairing. The integral fairing is configured, in a launch configuration, to enclose, between an aft portion and a forward portion, one or more payloads, and includes a mechanical attachment with the upper stage proximal to the aft portion, and a nose cap proximal to the forward portion. The integral fairing also includes a passive venting arrangement that equalizes pressures internal and external to the integral fairing. The integral fairing is configured to permit deployment of at least one payload, while avoiding: (i) separation of the integral fairing into two or more parts, (ii) separation of the integral fairing from the upper stage, and (iii) articulation of the mechanical attachment.

In some examples, the integral fairing may include at least one articulable hatch, proximate to a hatch opening, disposed between the forward portion and the aft portion; and the integral fairing may be configured to permit deployment of the at least one payload or a payload appendage through the hatch opening. In some examples, the launch vehicle may be configured to place an orbital vehicle into a low earth orbit, the orbital vehicle comprising the upper stage, the integral fairing, and at least one of the one or more payloads. In some examples, the orbital vehicle may be configured, in an on orbit configuration, such that the integral fairing is in a nadir pointing orientation, the nadir pointing orientation being at least partially maintained by passive gravity gradient stabilization.

In some examples, the upper stage provides a single stage to orbit capability.

In some examples, the launch vehicle may include at least one lower stage disposed, in the launch configuration, aft of the upper stage. In some examples, the at least one lower stage may be reusable.

In some examples, the integral fairing may be configured to permit deployment of a plurality of Cubesats.

According to some implementations, a method includes deploying at least one payload or payload appendage through a hatch opening of an integral launch vehicle fairing of a launch vehicle, the launch vehicle including an upper stage and the integral fairing. The integral fairing is configured, in a launch configuration, to enclose, between an aft portion and a forward portion, one or more payloads, and includes a mechanical attachment with the upper stage proximal to the aft portion, and a nose cap proximal to the forward portion. The integral fairing includes at least one articulable hatch, proximate to the hatch opening, disposed between the forward portion and the aft portion of the integral fairing. Deploying the at least one payload excludes: (i) separation of the integral fairing into two or more parts, (ii) separation of the integral fairing from the upper stage, and (iii) articulation of the mechanical attachment.

In some examples, the method may include configuring the integral launch vehicle fairing in an on orbit configuration such that the integral fairing is in a nadir pointing orientation, the nadir pointing orientation being at least partially maintained by passive gravity gradient stabilization.

According to some implementations, a launch vehicle integral fairing, is configured, in a launch configuration, to enclose, between an aft portion and a forward portion, one or more payloads, and includes a mechanical attachment with a launch vehicle upper stage proximal to the aft portion, and a nose cap proximal to the forward portion. The integral fairing includes at least one articulable hatch, proximate to the hatch opening, disposed between the forward portion and the aft portion of the integral fairing. The integral fairing is configured to permit deployment of at least one payload, while avoiding: (i) separation of the integral fairing into two or more parts, (ii) separation of the integral fairing from the launch vehicle upper stage, and (iii) articulation of the mechanical attachment with the launch vehicle upper stage.

In some examples, the integral fairing may be configured to permit deployment of the at least one payload or a payload appendage through the hatch opening.

In some examples, the integral fairing may include a passive venting arrangement that equalizes pressures internal and external to the integral fairing.

In some examples, in an on orbit configuration, the integral fairing may be disposed in a nadir pointing orientation, the nadir pointing orientation being at least partially maintained by passive gravity gradient stabilization.

In some examples, the integral fairing may include a payload dispenser proximate to the hatch opening, and the integral fairing may be configured to permit deployment of a plurality of Cubesats through the hatch opening.

In some examples, the integral launch vehicle fairing may include a plurality of articulable hatches and a plurality of hatch openings. In some examples, in the launch configuration, the integral launch vehicle fairing may enclose one or more of a solar array and a Cubesat dispenser, each of the solar array and the Cubesat dispenser being disposed proximate to a respective one of the plurality of hatch openings. In some examples, the integral fairing may include an antenna feed assembly reconfigurable from the launch configuration to an on orbit configuration such that in the launch configuration, the integral fairing encloses the antenna feed assembly and, in the on orbit configuration, the antenna feed assembly extends outward through a respective one of the plurality of hatch openings. In some examples, in the on orbit configuration, the antenna feed assembly may illuminate an antenna reflector.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which:

FIG. 4 illustrates an example of a possible deployment sequence for a payload appendage, along with a solar array mechanism, according to an implementation.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

Figure 1:
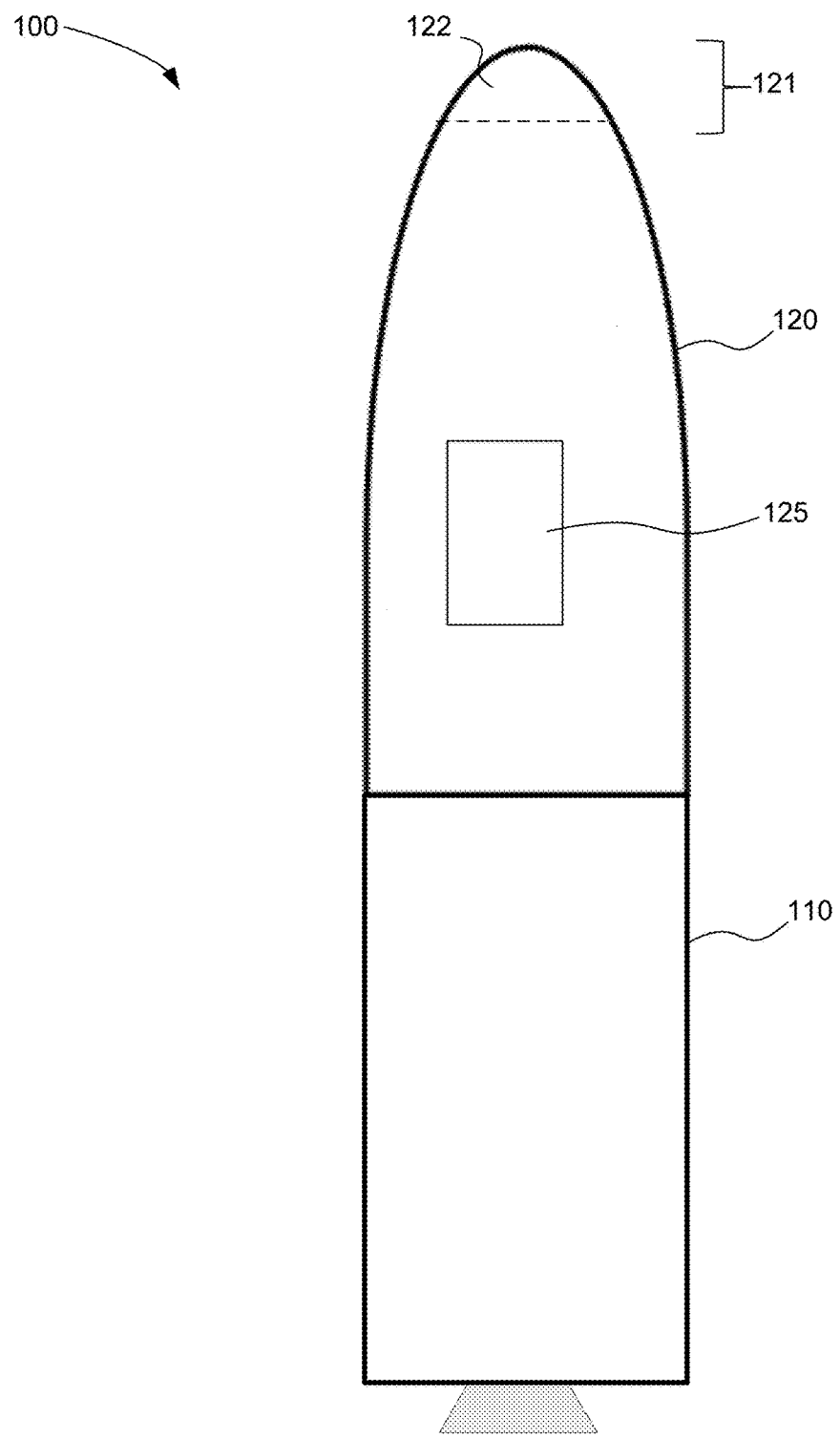
FIG. 1 illustrates an example of an expendable launch vehicle according to an implementation.

The present disclosure contemplates a non-separating ("integral") launch vehicle fairing, thus enabling simpler and less costly fabrication and construction. FIG. 1 illustrates an example of an expendable launch vehicle according to an implementation. The expendable launch vehicle 100 includes an upper stage 110 and integral fairing 120. The launch vehicle 100 may or may not include one or more additional stages (lower stages, not illustrated) aft of the upper stage 110. The integral fairing 120 may be configured to enclose one or more payloads (not illustrated). The integral fairing 120 may include a mechanical attachment at or near an aft portion of the integral fairing 120 that interfaces with an adapter ring or other structure of the upper stage 110. The integral fairing 120 may include a nose cap 122 proximal to a forward portion 121 of the integral fairing 120. In some implementations, the integral fairing 110 may be configured as a monocoque structure and may include a venting arrangement that passively equalizes pressures internal to the fairing and external to the fairing venting pressures.

In some implementations, the integral fairing 120 may include one or more hatches 125 to facilitate deployment of payloads or payload appendages as will be described in more detail hereinbelow. The hatches 125 may be articulable, by which is meant they may be reconfigurable from a closed position (e.g. for launch and ascent through the atmosphere) to an open position (e.g., for deployment of a payload or a payload appendage).

Advantageously, the integral fairing 120 may be configured to permit deployment of a payload or payload appendage by way of the articulable hatch 125 while avoiding separation of the integral fairing 120 into separate parts, avoiding separating the integral fairing 120 from the upper stage 110, and avoiding articulation of the mechanical attachment between the integral fairing 120 and the upper stage 110.

In some implementations, the integral fairing 120 may be configured as a monocoque cylindrical-conical structure. In some implementations, the integral fairing 120 may be mechanically attached to the launch vehicle prior to flight and may not be separated from the upper stage 110 during the mission life of the payload(s).

In some implementations, the integral fairing remains attached to at least an upper stage of an expendable launch at least until an initial orbit is established (i.e., at the end of launch phase). In some implementations, the integral nose cone remains attached to at least an upper stage of the expendable launch vehicle throughout a payload mission lifetime. In some implementations, the integral nose cone, together with the upper stage, is carried into orbit by a reusable lower stage of the launch vehicle. In some implementations integral nosecone is carried into orbit by an expendable launch vehicle which may be a single stage to orbit launch vehicle.

In some implementations, the integral fairing may, in the launch configuration, enclose a plurality of "smallsat" payloads that may be dispensed through one or more hatches 125. The integral nosecone may also include a reaction control subsystem (RCS) thrusters to provide attitude and orbit control during the payload mission lifetime.

In some implementations, the RCS may be disposed in or proximate to the forward portion 121 of the integral fairing 120 so as to provide maximum control authority. In some implementations, the RCS may be configured and/or operated in accordance with techniques described in U.S. Pat. No. 6,695,251, assigned to the assignee of the present invention, the disclosure of which is hereby incorporated by reference into the present application.

Figure 2:
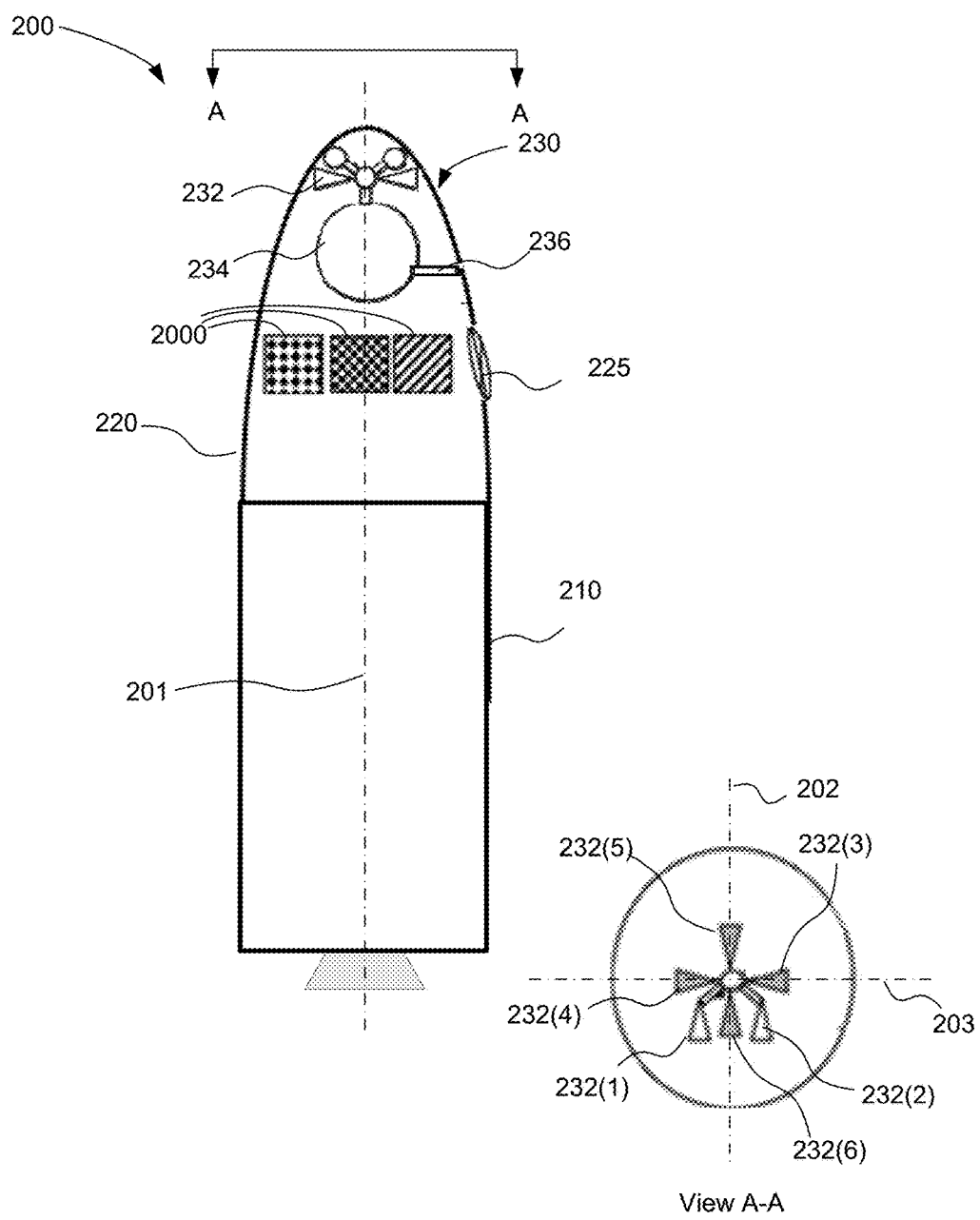
FIG. 2 illustrates an example of a launch vehicle, according to an implementation.

FIG. 2 illustrates an example of a launch vehicle, according to an implementation. The launch vehicle 200 includes an upper stage 210 and integral fairing 220. An RCS 230 is disposed in a forward portion of an integral fairing 220 of launch vehicle 200. The RCS 230 may include thrusters 232, a tankage arrangement 234, and service equipment (e.g., fill/drain valves and plumbing) 236. The integral fairing 220 may be pierced by various orifices (not illustrated) through which the RCS thrusters 232 may fire, and through which fill and drain valves for the propellant and/or pressurant supply for the thrusters may be accessed.

In the illustrated implementation, the RCS 230 includes six thrusters 232 disposed proximate to an upper portion of the integral fairing 220. The thrusters 232 may be configured to control vehicle attitude around all three coordinate axes (roll axis 201, pitch axis 202 and yaw axis 203). For example, as may be better observed in view A-A thrusters 232(1) and 232(2) may provide roll control torques, thrusters 232(3) and 232(4) may provide pitch control torques, and thrusters 232(5) and 232(6) may provide yaw control torques.

Referring still to FIG. 2, it may be observed that the integral fairing 220 encloses a plurality of payload elements 2000 disposed in lower (aft) portion of the integral fairing 220. Each payload element 2000 may be or include a small spacecraft ("smallsat"). The smallsats 2000 may be configured as, for example, Cubesats, Microsats (10-100 kg mass), Nanosats (1-10 kg mass) or Picosats (0.1-1 kg mass). In some implementations, the smallsats may be mounted in a dispenser (not illustrated) configured to separate one or more of the small sets into space through a hatch opening associated with articulable hatch 225.

Thus, the presently disclosed techniques contemplate launching multiple smallsats on a single launch vehicle. Subsequent to launch, the smallsats may be deployed one or more small hatches. In the example implementation illustrated in FIG. 2, three smallsats 2000 are depicted that may be deployed or dispensed using articulable hatch 225. Although for simplicity of illustration, only three smallsats 2000 are depicted, it will be appreciated that that a much larger quantity may be contemplated by the presently disclosed techniques. In some implementations, many tens, hundreds or even thousands of smallsats may be configured for launch on a single launch vehicle.

In some implementations, the payloads may be dispensed through the use of a Cal Poly Picosatellite Orbital Deployer (P-POD) dispenser, as has been proposed or implemented for other Cubesat missions. The size of the dispenser and/or quantity of dispensers may be varied in view of the size and payload capability of the launch vehicle.

Figure 3:
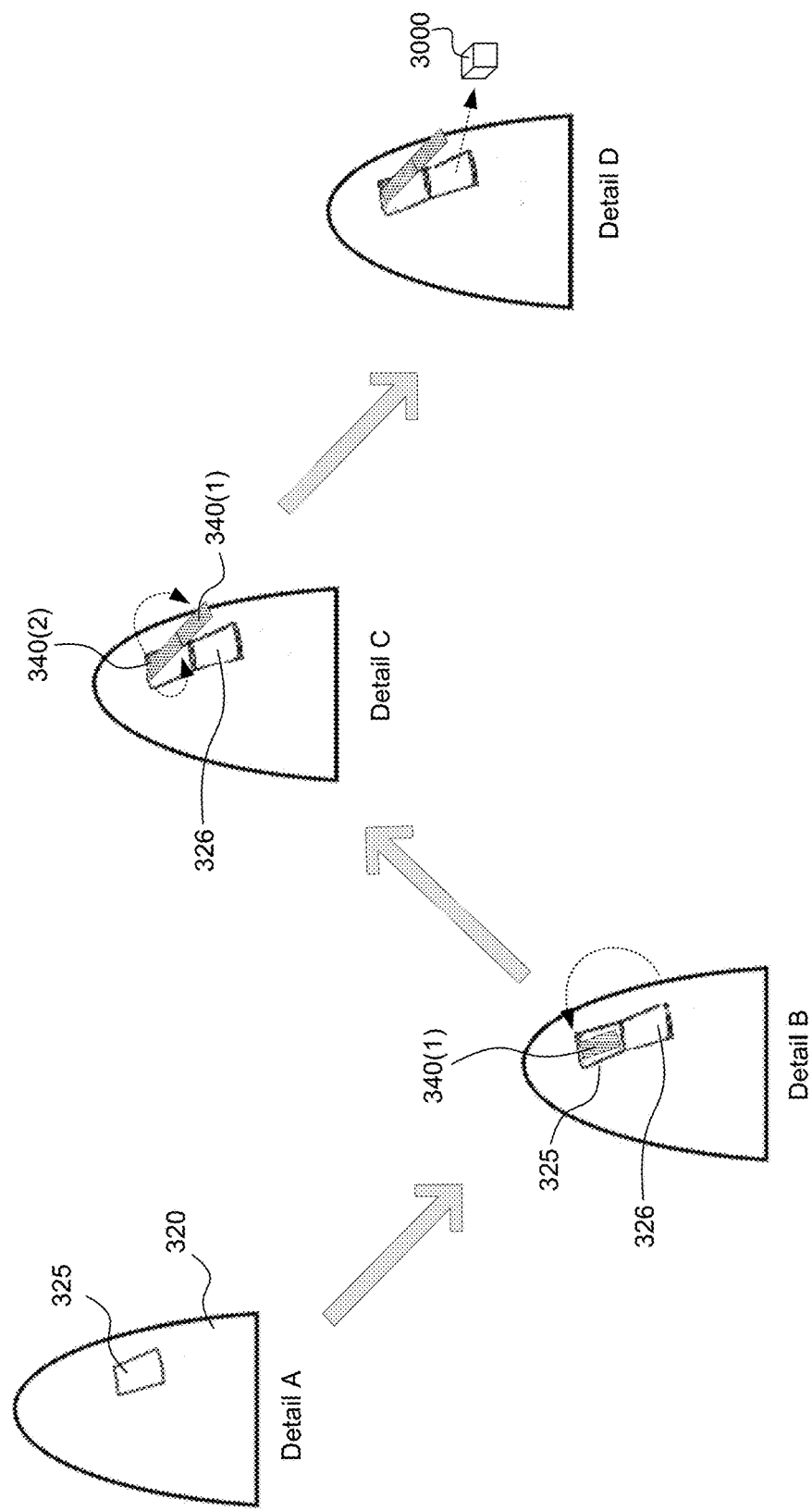
FIG. 3 illustrates an example of a possible deployment sequence for a dispensed payload, along with a solar array mechanism, according to an implementation.

FIG. 3 illustrates an example of a possible deployment sequence for a dispensed payload, along with a solar array mechanism, according to an implementation. Referring first to Detail A, an external view of an integral launch fairing 320, including articulable hatch 325 is depicted. To commence the example deployment sequence, holddowns (not illustrated) that secure articulable hatch 325 in the closed position may be fired. As a result, the articulable hatch 325 may is reconfigured from the closed position to an open position as illustrated in Detail B. In the example illustrated in FIG. 3, the articulable hatch 325 is rotatable about a hinge line proximate to a forward edge of a hatch opening 326. In some implementations, a passive mechanism such as a spring-loaded hinge may cause the articulable hatch 325 to rotate about the hinge line. In the illustrated implementation, a solar array including one or more solar array panels 340 may be disposed on a surface (an interior surface when the articulable hatch is closed) of the articulable hatch 325. Thus, as a result of opening the articulable hatch 325, the solar array panel 340(1) has a clear view of space.

In some implementations, a further deployment sequence, as illustrated in Detail C, may cause the solar to extend away from the integral fairing 320. Moreover, in the illustrated implementation, a first solar array panel 340(1) may rotate about a hinge line between the first solar array panel 340(1) and a second solar array panel 340(2). The deployment sequence may be executed using passively driven arrangements (e.g., by springs) and/or actively driven arrangements (e.g., motor driven) and may be initiated after firing one or more solar array holddowns not illustrated.

Referring now to Detail D, dispensing of a smallsat payload 3000 is depicted. The smallsat payload 3000, as discussed above, may be a Cubesat. In some implementations, the smallsat payload 3000 may be deployed using a P-POD dispenser (not illustrated). The deployed solar array may be configured to provide power to the dispenser and/or housekeeping power to one or more undeployed smallsat payloads.

In some implementations a payload or other appendage may be extended through an opening of an articulable hatch without necessarily separated from the integral fairing. FIG. 4 illustrates an example of a possible deployment sequence for a payload appendage, along with a solar array mechanism, according to an implementation. Referring first to Detail E, an external view of an integral launch fairing 420, including articulable hatch 425 is depicted. To commence the example deployment sequence, holddowns (not illustrated) that secure articulable hatch 425 in the closed position may be fired. As a result, the articulable hatch 425 may is reconfigured from the closed position to an open position as illustrated in Detail F. In the illustrated implementation, a solar array including one or more solar array panels 440, initially disposed on a surface of the articulable hatch 425 may deployed in a manner similar to that described in connection with FIG. 3 above.

Referring now to Detail G, dispensing of a payload appendage 450 is depicted. The payload appendage 450 may be a camera or other imager, magnetometer or other instrument. In the illustrated implementation, the payload appendage 450 is configured to be moved outboard of the integral fairing 420 by articulable structural member 455, resulting in the configuration illustrated in Detail H. The structural member 455 may be an extendable or in foldable member configured to place the payload appendage 450 in a desired location with respect to the integral fairing 420. In some implementations, the structural member 455 may be retractable after having been extended one or more times. In other implementations the structural member 455 may be extendable only once. The deployed solar array may be configured to provide power to the payload appendage 450 as well as housekeeping power to one or more other payloads.

Figure 5A:
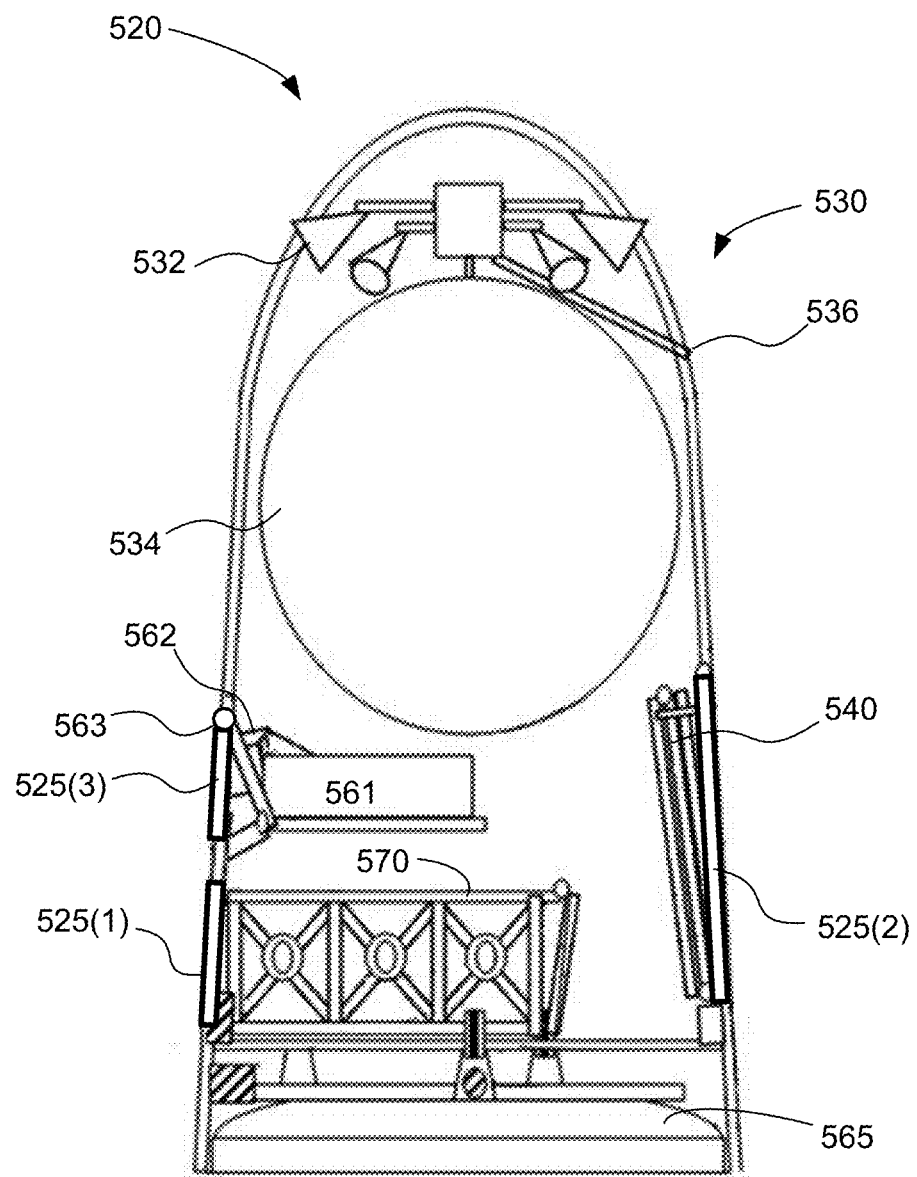
FIGS. 5A-5C illustrate an integral fairing according to a yet further implementation.
Figure 5B:
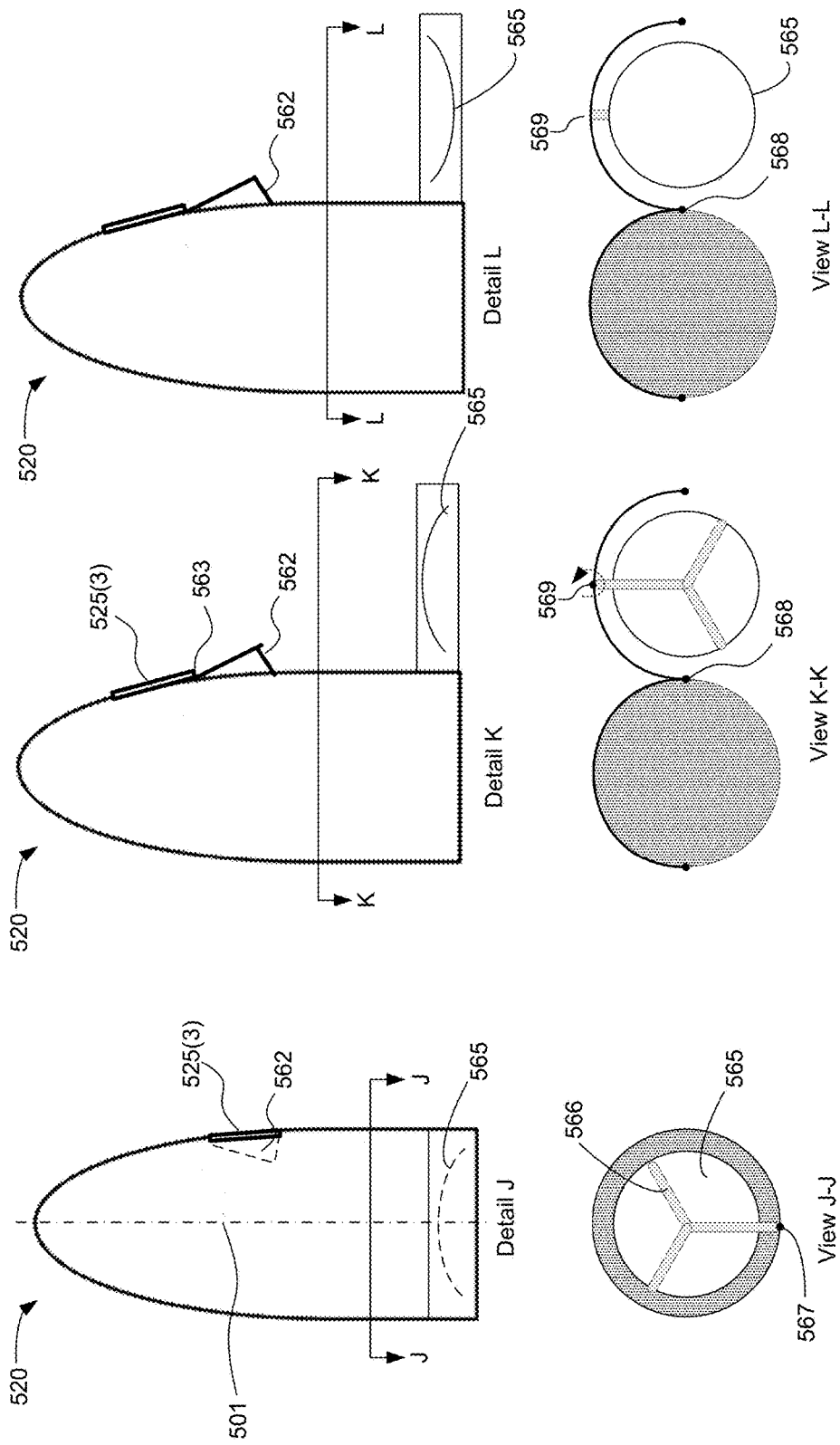
Figure 5C:
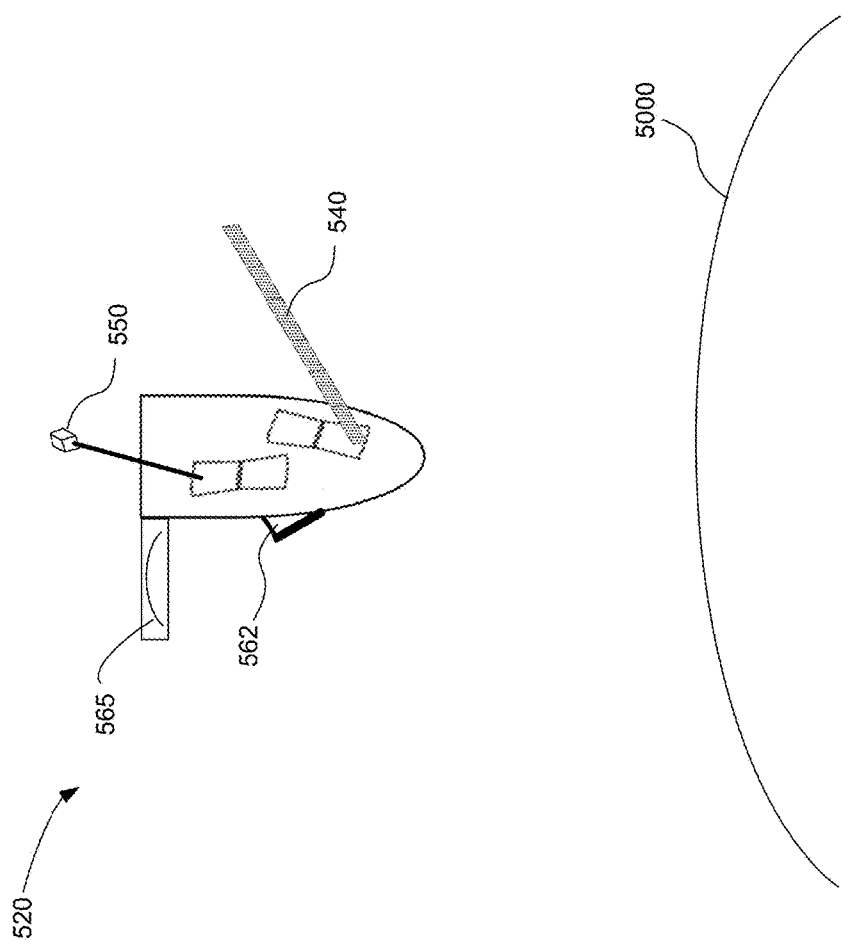

FIGS. 5A-5C illustrate an integral fairing according to a yet further implementation. In the illustrated implementation, referring first to FIG. 5A, integral fairing 520 is configured to dispense a payload of one or multiple Cubesats and also includes a resident communications payload that remains with the integral fairing 520 after the Cubesats are dispensed. In the illustrated implementation, the integral fairing 520 encloses RCS 530 disposed in a forward portion of the integral fairing 520. The RCS 530 includes thrusters 532 a tankage arrangement 534 and a fill drain valve assembly 536.

The integral fairing 520 also encloses a P-POD dispenser 570 that may be configured to eject or dispense any number of Cubesats through an opening associated with articulable hatch 525(1). Although in the illustrated implementation a single dispenser 570 is illustrated, multiple dispensers 570 may be contemplated. In general, the size of the dispenser 570 and/or quantity of dispensers may be selected in view of the payload capability of the launch vehicle.

The integral fairing 520 also encloses a solar array 540 may be extended outside the integral fairing 520 by way of an opening associated with articulable hatch 525(2). Integral fairing 520 also encloses a communications payload subsystem, the communications payload subsystem including a communications payload module 561, an antenna feed assembly 562, and an antenna reflector 565. The antenna feed assembly 562 and the antenna reflector 565 may each be deployed so as to be at least partially external to the integral fairing 520. For example, the antenna feed assembly 562 may be rotatable about hinge 563 so as to extend outward through an opening associated with articulable hatch 525(3). In the deployed configuration, As may be more clearly observed in FIG. 5C, the antenna feed assembly 562 may illuminate the antenna reflector 565, which in turn may be communicatively coupled with one or more ground stations.

Referring now to FIG. 5B, an example deployment sequence concept for the antenna feed assembly 562 and antenna reflector 565 will be described. Referring first to Detail J, it may be observed that in a launch configuration both the feed assembly 562 and the antenna reflector 565 are enclosed by the integral fairing 520. In the illustrated implementation, the antenna reflector 565 is disposed proximal to an aft portion of the integral fairing 520 with an aperture plane of the antenna reflector being substantially transverse to longitudinal axis 501 of the integral fairing 520. The antenna reflector 565 includes a backup structure 566, mechanically coupled, at attachment 567 with the integral fairing 520.

Referring now to Detail K, the articulable hatch 525(3) is depicted as being in the open position and the antenna feed assembly 562 is depicted as having been extended through an opening associated with the articulable hatch 525(3). In the illustrated implementation the antenna feed assembly 562 may be rotated about a hinge 563 so as to extend outward through the opening associated with articulable hatch 525(3). In some implementations, the antenna feed assembly 562 may be rotated about the hinge 563 after firing holddowns (not illustrated) that support antenna feed assembly 562 in the launch configuration. The hinge 563 may be a spring-loaded hinge, in some implementations. Detail K also illustrates the antenna reflector 565 in a deployed configuration substantially outboard with respect to the launch configuration. More particularly, in the illustrated implementation, a segment of an aft portion of the fairing 520, coupled with the antenna reflector 565 by way of attachment 567, has been rotated 180° about a hinge line passing through location 568. In some implementations, rotation of the aft portion of the fairing 520 may occur after firing a set of radial holddowns (not illustrated) that support the antenna reflector 565 in the launch configuration. In some implementations, a spring-loaded hinge or other one-degree of freedom mechanism may be provided at location 568.

Where, as in the illustrated implementation, the concave surface of the antenna reflector 565, in the launch configuration is facing aft, an additional 180° rotation may be implemented about a hinge line passing through location 569, resulting in the configuration depicted in Detail L. In some implementations, a spring-loaded hinge or other one-degree of freedom mechanism may be provided at location 569.

Referring now to FIG. 5C, the integral fairing 520 is depicted in an on orbit configuration. In the illustrated implementation the integral fairing 520 is depicted as orbiting a celestial body 5000 (e.g., the earth), and includes a payload appendage 550 (e.g., a camera or other imaging device, magnetometer or other instrument) and deployed solar array 540. The illustrated instrumentation may be advantageous for missions which utilize a constellation of multiple free-flying Cubesats in close proximity, for which information can be transferred through a centralized location employing equipment within the integral fairing 520 at a higher data rate while reducing the volume and mass required for data transmission capabilities aboard the Cubesats. In some implementations, the integral fairing 520 may remain attached to a launch vehicle upper stage (not illustrated) in the on orbit configuration. Whether or not this is so, the integral fairing, advantageously, may be maintained in a nadir pointing orientation, as illustrated. Advantageously, the nadir pointing orientation may be at least partially maintained by passive gravity gradient stabilization.

Figure 6:
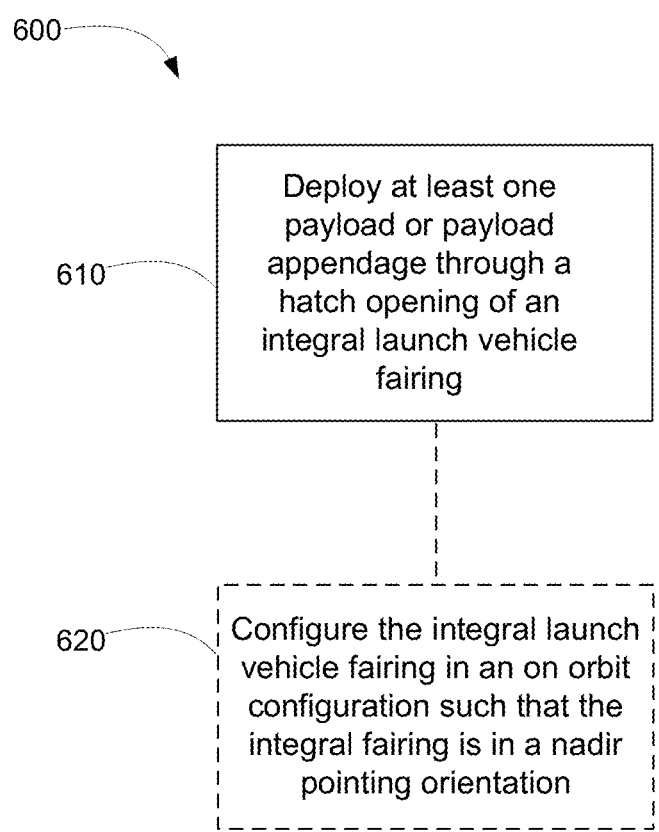
FIG. 6 illustrates a process flow diagram for deploying a payload or payload appendage, according to an implementation.

FIG. 6 illustrates a process flow diagram for deploying a payload or payload appendage, according to an implementation. As described hereinabove, the payload or payload appendage may be enclosed in a launch configuration by an integral launch vehicle fairing of a launch vehicle. The method 600 may start, at block 610, with deploying at least one payload or payload appendage through a hatch opening of the integral launch vehicle fairing. The launch vehicle may include an upper stage and the integral fairing. The integral fairing may be configured, in a launch configuration, to enclose, between an aft portion and a forward portion, one or more payloads, and may include a mechanical attachment with the upper stage proximal to the aft portion, and a nose cap proximal to the forward portion. The integral fairing may include at least one articulable hatch, proximate to the hatch opening, disposed between the forward portion and the aft portion of the integral fairing. Advantageously, deploying the at least one payload excludes: (i) separation of the integral fairing into two or more parts, (ii) separation of the fairing from the upper stage, and (iii) articulation of the mechanical attachment. Optionally, at block at block 620, the integral launch vehicle fairing may be configured, in an on orbit configuration, such that the integral fairing is in a nadir pointing orientation, the nadir pointing orientation being at least partially maintained by passive gravity gradient stabilization.

One benefit of the presently disclosed techniques is to provide a launch vehicle fairing that has dual functions: first, to reduce drag and aerodynamic forces and torques, while protecting the payload from heating and other harmful effects during launch and ascent through the atmosphere, and, second, to act as a spacecraft structure and support system during the orbital phase of the mission. In addition, the disclosed techniques enable the cost of a launch vehicle fairing to be substantially reduced since it may be designed and fabricated without regard to arrangements for dividing the fairing into two or more separable elements and for separating the fairing from the launch vehicle and/or the payloads during the launch phase. As a result, the cost and complexity of assuring that separable elements of the nosecone fit together to form a structure that is sufficiently sturdy to accommodate aerodynamic loads during ascent may be avoided.

Thus, techniques enabling a low-cost launch vehicle fairing have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A launch vehicle comprising:
   an upper stage and an integral fairing, wherein the integral fairing:
   in a launch configuration, encloses, between an aft portion and a forward portion, one or more payloads, and includes a mechanical attachment with the upper stage proximal to the aft portion, and a nose cap proximal to the forward portion;
   includes a passive venting arrangement that equalizes pressures internal and external to the integral fairing; and permits deployment of at least one of the one or more payloads, without: (i) separating the integral fairing into two or more parts, (ii) separating the integral fairing from the upper stage, (iii) articulating the nose cap, and (iv) articulating the mechanical attachment.

2. The launch vehicle of claim 1, wherein
the integral fairing includes at least one articulable hatch, proximate to a hatch opening, disposed between the forward portion and the aft portion; and
the integral fairing is configured to permit deployment of the at least one payload or a payload appendage through the hatch opening.

3. The launch vehicle of claim 2, wherein the launch vehicle is configured to place an orbital vehicle into a low earth orbit, the orbital vehicle comprising the upper stage, the integral fairing, and at least one of the one or more payloads.

4. The launch vehicle of claim 1, wherein the upper stage provides a single stage to orbit capability.

5. The launch vehicle of claim 1, further comprising at least one lower stage disposed, in the launch configuration, aft of the upper stage.

6. The launch vehicle of claim 5, wherein the at least one lower stage is reusable.

7. A method comprising:
deploying at least one payload or payload appendage through a hatch opening of an integral launch vehicle fairing of a launch vehicle, the launch vehicle including an upper stage and the integral fairing, wherein:
the integral fairing is configured, in a launch configuration, to enclose, between an aft portion and a forward portion, one or more payloads, and includes a mechanical attachment with the upper stage proximal to the aft portion, and a nose cap proximal to the forward portion;
the integral fairing includes at least one articulable hatch, proximate to the hatch opening, disposed between the forward portion and the aft portion of the integral fairing; and
deploying the at least one payload excludes: (i) separation of the integral fairing into two or more parts, (ii) separation of the integral fairing from the upper stage, (iii) articulation of the nose cap, and (iv) articulation of the mechanical attachment.

8. A launch vehicle integral fairing, wherein the integral fairing:
in a launch configuration, encloses, between an aft portion and a forward portion, one or more payloads, and includes a mechanical attachment with a launch vehicle upper stage proximal to the aft portion, and a nose cap proximal to the forward portion;
includes at least one articulable hatch, proximate to the hatch opening, disposed between the forward portion and the aft portion of the integral fairing; and
permits deployment of at least one of the one or more payloads, without: (i) separating the integral fairing into two or more parts, (ii) separating the integral fairing from the launch vehicle upper stage, (iii) articulating the nose cap, and (iv) articulating the mechanical attachment with the launch vehicle upper stage.

9. The integral fairing of claim 8, wherein
the integral fairing is configured to permit deployment of the at least one payload or a payload appendage through the hatch opening.

10. The integral fairing of claim 8, wherein the integral fairing includes a passive venting arrangement that equalizes pressures internal and external to the integral fairing.

11. The integral fairing of claim 8, wherein the integral launch vehicle fairing includes a plurality of articulable hatches and a plurality of hatch openings.

12. The integral fairing of claim 11, further comprising an antenna feed assembly reconfigurable from the launch configuration to an on orbit configuration such that:
in the launch configuration, the integral fairing encloses the antenna feed assembly; and
in the on orbit configuration, the antenna feed assembly extends outward through a respective one of the plurality of hatch openings.

* * * * *